United States Patent [19]

Bowers et al.

[11] Patent Number: 5,546,529
[45] Date of Patent: Aug. 13, 1996

[54] METHOD AND APPARATUS FOR VISUALIZATION OF DATABASE SEARCH RESULTS

[75] Inventors: Frank H. Bowers, Mountain View; Stuart K. Card, Los Altos Hills, both of Calif.

[73] Assignee: Xerox Corporation, Stamford, Conn.

[21] Appl. No.: 283,004

[22] Filed: Jul. 28, 1994

[51] Int. Cl.[6] .................................................. G06F 15/72
[52] U.S. Cl. ............................................................ 395/159
[58] Field of Search ..................................... 395/140, 155, 395/158, 159, 160, 161, 118, 119

[56] References Cited

U.S. PATENT DOCUMENTS

| | | | |
|---|---|---|---|
| 4,528,585 | 7/1985 | Bolger | 358/22 |
| 4,613,946 | 9/1986 | Forman | 364/518 |
| 4,649,499 | 3/1987 | Sutton et al. | 364/518 |
| 4,685,070 | 8/1987 | Flinchbaugh | 364/522 |
| 4,710,763 | 12/1987 | Franke et al. | 340/723 |
| 4,742,558 | 5/1988 | Ishibashi et al. | 382/56 |
| 4,752,889 | 6/1988 | Rappaport et al. | 364/513 |
| 4,764,867 | 8/1988 | Hess | 364/200 |
| 4,772,882 | 9/1988 | Mical | 340/709 |
| 4,807,158 | 2/1989 | Blanton et al. | 364/521 |
| 4,808,987 | 2/1989 | Takeda et al. | 340/721 |
| 4,821,211 | 4/1989 | Torres | 364/521 |
| 4,858,149 | 8/1989 | Quarendon | 364/522 |
| 4,931,783 | 6/1990 | Atkinson | 340/710 |
| 4,974,173 | 11/1990 | Stefik et al. | 364/521 |
| 4,974,174 | 11/1990 | Kleinman | 364/521 |
| 4,982,344 | 1/1991 | Jordan | 364/521 |
| 5,021,976 | 6/1991 | Wexelblat et al. | 364/521 |
| 5,065,347 | 11/1991 | Pajak et al. | 395/159 |
| 5,072,412 | 12/1991 | Henderson et al. | 395/159 |
| 5,103,217 | 4/1992 | Cawley | 395/129 |
| 5,146,555 | 9/1992 | Kiyohara | 395/157 |
| 5,155,806 | 10/1992 | Hoeber et al. | 395/1573 |
| 5,224,209 | 6/1993 | Hirai et al. | 395/150 |
| 5,230,063 | 7/1993 | Hoeber et al. | 395/156 |
| 5,237,651 | 8/1993 | Randall | 395/148 |
| 5,295,243 | 3/1994 | Robertson et al. | 395/160 |
| 5,297,253 | 3/1994 | Meisel | 395/160 |
| 5,428,738 | 6/1995 | Carter et al. | 395/161 |

FOREIGN PATENT DOCUMENTS

| | | |
|---|---|---|
| 260144A2 | 3/1988 | European Pat. Off. . |
| 309374A2 | 3/1989 | European Pat. Off. . |
| 319232A2 | 6/1989 | European Pat. Off. . |
| 323302A1 | 7/1989 | European Pat. Off. . |
| 352741A2 | 1/1990 | European Pat. Off. . |
| 353952A2 | 2/1990 | European Pat. Off. . |
| 435601A2 | 7/1991 | European Pat. Off. . |
| 447095A2 | 9/1991 | European Pat. Off. . |
| 535986A2 | 4/1993 | European Pat. Off. . |
| 2138466 | 3/1984 | United Kingdom . |
| 2187580 | 9/1987 | United Kingdom . |

OTHER PUBLICATIONS

Cahn, D., "A PHIGS Technical Overview", *Using the PHIGS Standard*, Sigraph '87, Anaheim, California, Jul. 27–31, 1987, pp. 73–110.

(List continued on next page.)

*Primary Examiner*—Phu K. Nguyen
*Attorney, Agent, or Firm*—Richard B. Domingo

[57] ABSTRACT

A method and apparatus for representing the results of a search of a database. The present invention provides for creating a view of database search results via a tree structure in which detail is selected and context preserved. In the present invention, the tree structure is created based on user specified parameters. These parameters represent attributes of documents stored in the database and may differ from the search parameters. The tree structure is then mapped to a static reference surface which is visually perceived as three-dimensional. The reference surface is comprised of a detail area where detail of the tree structure is displayed and a context area for displaying other portions of the tree in less detail but which conveys to the viewer a sense of context. The tree structure may be scrolled about the reference surface to bring portions of the structure into a direct detail view while retaining a context view of the overall tree.

9 Claims, 12 Drawing Sheets

OTHER PUBLICATIONS

Fairchild, K. M., Poltrock, S. E., and Furnas, G. W., "SemNet: Three-Dimensional Graphic Representations of Large Knowledge Bases," in Guindon, R., Ed., Cognitive Science and its Application for Human Computer Interatcion, Lawrence Erlbaum, Hillsdale, New Hersey, 1988, pp. 201–233.

Smith, A. R., "Plants, Fractuals, and Formal Languages," in Computer Graphics, vol. 18, No. 3, Jul. 1984.

Thessman, T., "Casting Shadows on Flat Surfaces," IRIS Universe, Winter 1989, pp. 16 and 18–19.

Robertson, G. G., Card, S. K., and Mackinlay, J. D., "The Cognitive Coprocessor Architecture for Interactive User Interfaces," Proceedings of the ACM SIGGRAPH Symposium on User Interface Software and Technology, Williamsburg, Virginia, Nov. 13–15, 1989, pp. 10–18.

Pope, S. T., Goldberg, A., and Leibs, D., "The ParcPlace Systems Navigator Applications and Frameworks," presented at ACM SigGraph Symposium on User Interface Software, Oct. 1988, Banff, Canada, pp. 1–30.

Furnas, G. W., "Generalized Fisheye Views," CHI '86 Proceedings, ACM, Apr. 1986, pp. 16–23.

MacPaint Manual, Apple Computer, Inc. pp. 1–11, 14–32, 1992.

Feiner, Steven et al., "An Experiment System for Creating and Presenting Ineractive Graphical Documents," *ACM Transactions on Graphics*, vol. 1, No. 1, Jan. 1982, pp. 59–77.

Sutherland, I. E., "Sketchpad—A Man-Machine Graphical Communication System," AFIPS Spring Joint Computer Conference, vol. 23 (1963) pp. 329–346.

Bolt, R. A., *The Human Interface*, Lifetime Learning Publications, Belmont, California, 1984, pp. 8–34.

Herot, C. F., "Spatial Management of Data," *ACM Trans. on Database Systems*, vol. 5, No. 4 (Dec. 1980), pp. 493–514.

Wilson, Kathleen S., "Palenque: An Interactive Multimedia Optical Disc Prototype for Children," Center for Children and Technology, Bank Street College of Education, New York, Working Paper No. 2, Mar. 1987, pp. 1–8.

Beier, T. and Neely, S., "Feature-Based Image Metamorphosis," *Computer Graphics*, 25, 2, Jul. 1992, pp. 35–42.

Wolberg, G., *Digital Image Warping*, IEEE Computer Society Press, Los Alamitos, California, 1990, pp. 1–10, 222–240, and 301–314.

Farrand, W. A., "Information Dispaly in Interactive Design," Doctoral Thesis, University of California Los Angeles 1973.

Nielsen, "The Art of Navigating Through Hypertext," Mar. 1990, Communications of the ACM, pp. 297–310.

Dalton, R., "Beyond Bifocals: Help for tired eyes," *Lotus*, vol. 4, No. 10, Oct. 1988, pp. 17–18.

inLarge brochure, Berkeley Systems, Inc., Berkeley, California, 1992.

Edel, M. "The Tinkertoy Graphical Programming Environment," IEEE Transactions on Software Engineering, Aug. 1988, pp. 1110–1115.

Halasz, F. G., Moran, T. P., and Trigg, R. H., "NoteCards in a Nutshell," in Proceedings of CHI+GI 1987 (Toronto, Apr. 5–9, 1987), ACM, New York, 1987, pp. 45–52.

Spence, R. and Apperley, M. "Data Base Navigation: An Office Environment for the Professional," Behaviour and Information Technology, vol. 1, No. 1, 1982, pp. 43–54.

METHOD AND APPARATUS FOR VISUALIZATION OF DATABASE SEARCH RESULTS

FIELD OF THE INVENTION

The present invention relates generally to the field of information display, and in particular to providing a visual display relating to the results of a database search.

BACKGROUND OF THE INVENTION

It is well understood that information visualizations provide insights to the underlying data. For example, for any given set of information, new information regarding patterns or relationships can be obtained by looking at attributes of the information. It is often useful to view the attributes of the information in a hierarchical structure. However, a difficulty lies in displaying large hierarchical structures in a limited display area.

EP 0 435 601 A2, entitled "Display of Hierarchical Three-Dimensional Structures", Robertson, et al., which is assigned to the assignee of the present invention discloses a technique for displaying and manipulating three-dimensional representations of a tree structure which have rotating substructures.

U.S. Pat. No. 4,752,889, entitled "Dynamic, Interactive Display System For A Knowledge Base", Rapport, et al., describes a graphic display that shows links between chunks of knowledge. The user, with mouse clicks, can obtain a display of links from a displayed chunk of knowledge to other chunks of knowledge, which are added to the display. Screen scrolling mechanisms allow movement from one area of the overall graph to another.

EP 0 535 986 A2, entitled "Method of Operating A Processor", Robertson, which is assigned to the assignee of the present invention describes a method for centering a selected node of a node link structure along a centering line. The nodes are in rows, and each row extends across a centering line with links between nodes in adjacent rows. When a user requests a centering operation for an indicated node, a sequence of images is presented, each including a row that appears to be a continuation of the row with the indicated node and that includes a continued indicated node that appears to be a continuation of the indicated node. The rows appear to be shifted, bringing the continued indicated nodes toward the centering line, until a final shift locks the continued indicated node into position at the centering line. The positions of the indicated node and a subset of the continued indicated nodes together can define an asymptotic path that begins at the position of the indicated node and approaches the center line asymptotically until the final shift occurs. The displacements between positions can follow a logarithmic function, with each displacement being a proportion of the distance from the preceding position to the centering line. Each node can be rectangular, and the nodes in each row can be separated by equal offsets to provide compact rows. Each node can be a selectable unit, so that the user can request a centering operation by selecting a node, such as with a mouse click.

Furnas, G. W., "Generalized Fisheye Views," CHI '86 Proceedings, ACM, April 1986, pp. 16–23, describes fisheye views that provide a balance of local detail and global context. Section 1 discusses fisheye lenses that show places nearby in great detail while showing the whole world, showing remote regions in successively less detail; a caricature is the poster of the "New Yorker's View of the United States." Section 3 describes a degree of interest (DOI) function that assigns to each point in a structure, a number telling how interested the user is in seeing that point, given the current task. A display can then be made by showing the most interesting points, as indicated by the DOI function. The fisheye view can achieve, for example, a logarithmically compressed display of a tree, as illustrated by FIG. 4 of Furnas for a tree structured text file. Section 4 also describes fisheye views for botanical taxonomies, legal codes, text outlines, a decisions tree, a telephone area code directory, a corporate directory, and UNIX file hierarchy listings. Section 5 indicates that a display-relevant notion of a priori importance can be defined for lists, trees, acylic directed graphs, general graphs, and Euclidean spaces, unlike the geographical example which inspired the metaphor of the "New Yorker's View," the underlying structures need not be spatial, nor need the output be graphic. FIG. 6 of Furnas shows a fisheye calendar.

EP 0447 095A, Robertson, et al., entitled "Workspace Display", which is assigned to the assignee of the present invention discloses a processor which presents a sequence of images of a workspace that is stretched to enable the user to view a part of a workspace in greater detail. The workspace includes a middle section and two peripheral sections that meet the middle section on opposite edges. Each of the sections appears to be a rectangular two-dimensional surface and they are perceptible in three dimensions. When the user is viewing the middle section as if it were parallel to the display screen surface, each peripheral section appears to extend away from the user at an angle from the edge of the middle section so that the peripheral sections occupy relatively little of the screen. When the user requests stretching, the middle section is stretched and the peripheral sections are compressed to accommodate the stretching. When the user requests destretching, the middle section is destretched and the peripheral sections are decompressed accordingly.

SUMMARY OF THE INVENTION

The present invention enables the organization and visualization of database search results independent of the search parameters. Often, it is desirable to obtain properties of the search results independent of the search parameters. For example, a search on a database may be performed by specifying the authors. It may be undesirable to limit the search by specifying a date. It may later be desirable to organize the search results by date in order to determine when particular documents were created.

In the present invention, a tree structure is created based on the search results and user specified parameters. The user specified parameters represent attributes of documents stored in the database and may differ from the search parameters. The tree structure is then mapped to a static reference surface which is visually perceived as three-dimensional. The reference surface is comprised of a detail area where detail of the tree structure is displayed and a context area for displaying other portions of the tree in less detail but which conveys to the viewer a sense of context. The tree structure may be scrolled about the reference surface to bring portions of the structure into a direct detail view while retaining a context view of the overall tree.

DETAILED DESCRIPTION OF THE PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This application is related to co-pending application entitled "A Method and Apparatus for Visualization of A Tree Structure On A Three-dimensional Surface", serial no. not yet assigned, and which is assigned to the assignee of the present application.

A method and apparatus for visualization of the results of a database search is described herein. In the following description numerous specific details are set forth, such as data models for representing a tree structure, in order to provide a thorough understanding of the present invention. It would be apparent, however, to one skilled in the art to practice the invention without such specific details. In other instances, specific implementation details such as the system calls for causing a tree structure to be displayed on a screen, have not been shown in detail in order not to unnecessarily obscure the present invention.

Hierarchically related information is often represented as a tree. As used herein, the term node will refer to a point on the tree structure. Each node includes pointers to a parent node, a child node and a sibling node to create the tree structure. A root node is the highest level node. Leaf nodes are the bottom level nodes.

When a tree structure becomes large, it may be difficult to present the entire tree on a display area in full detail. Thus, it may be difficult to trace that path of a node. Further, it is often desirable to know where a particular node in a tree structure is located in order to understand the context of the data. The present invention addresses this by providing a three-dimensional context view of the tree which can be scrolled.

It should be noted that a tree is in the general class of node-link structures. As will become apparent in the description below, the present invention could be implemented so as to support other node link structures.

Various techniques are known in the art for rendering three-dimensional images on two dimensional display screens. However, manipulating three-dimensional images is computationaly intensive. Often, expensive 3-D graphics hardware is used in order to render images in an acceptable timeframe. The present invention avoids the need for using sophisticated hardware to provide a three dimensional visualization which can be manipulated. In the present invention, a three dimensional reference surface is created, about which the information moves. This provides for seeing the entire composition or path to the end nodes of a tree structure.

As will become apparent in the description below, the currently preferred embodiment of the present invention is used to provide visualizations of the results of a database search (often, important information can be determined by examining relationships between the various search results.) However, it would be apparent to one of skill in the art to apply the present invention to other hierarchically structured information.

Figure 1:
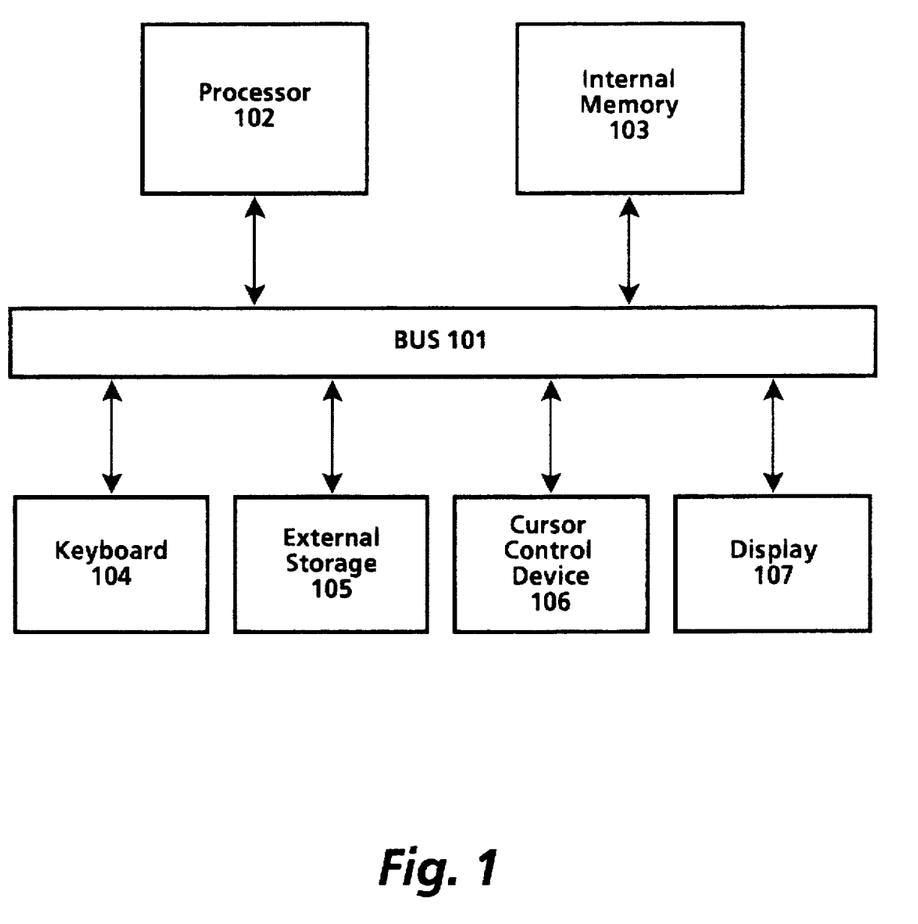
FIG. 1 is a block diagram of computer controlled display system in the currently preferred embodiment of the present invention.

Overview of a Computer Controlled Display System In the Currently Preferred Embodiment of the Present Invention The computer based system on which the currently preferred embodiment of the present invention may be implemented is described with reference to FIG. 1. Referring to FIG. 1, the computer based system is comprised of a plurality of components coupled via a bus 101. The bus 101 may consist of a plurality of parallel buses (e.g. address, data and status buses) as well as a hierarchy of buses (e.g. a processor bus, a local bus and an I/O bus). In any event, the computer system is further comprised of a processor 102 for executing instructions provided via bus 101 from Internal memory 103 (note that the Internal memory 103 is typically a combination of Random Access and Read Only Memories). The processor 102 will be used to perform various operations in support of creating the tree visualizations. Such operations that would be performed by the processor 102 are described with reference to FIGS. 6–10. The processor 102 and Internal memory 103 may be discrete components or a single integrated device such as an Application Specification Integrated Circuit (ASIC) chip.

Also coupled to the bus 101 are a keyboard 104 for entering alphanumeric input, external storage 105 for storing data, a cursor control device 106 for manipulating a cursor, and a display 107 for displaying visual output. The keyboard 104 would typically be a standard QWERTY keyboard but may also be telephone like keypad. The external storage 105 may be fixed or removable magnetic or optical disk drive. The cursor control device 106, e.g. a mouse or trackball, will typically have a button or switch associated with it to which the performance of certain functions can be programmed.

The currently preferred embodiment of the present invention is designed for use on a commercially available IBM compatible computer system available from various vendors, and which is running the Microsoft Windows 3.1 Operating System. The Windows operating system provides for the use of multiple workspaces concurrently. The operation of Windows-like operating systems is well known in the art.

In operation, the currently preferred embodiment of the present invention will also make use of various user interface facilities. The cursor control device is used to position a cursor located on the display to a desired location (i.e. "point" to the desired location). When the cursor control device is positioned (i.e. pointing) to something on a display, the button associated with the cursor control device may be depressed and released in order to invoke an action. This is referred to as a "click". A different function may be invoked if the button is depressed and released twice in succession. This is referred to as a "double click." When a user points to an object on the display, depresses the button and holds it down, the object will follow the cursor and be placed at the location on the display where the button is released. This is referred to as a "drag and drop" or "drag" operation.

Overview of the Tree Visualization

Figure 2A:
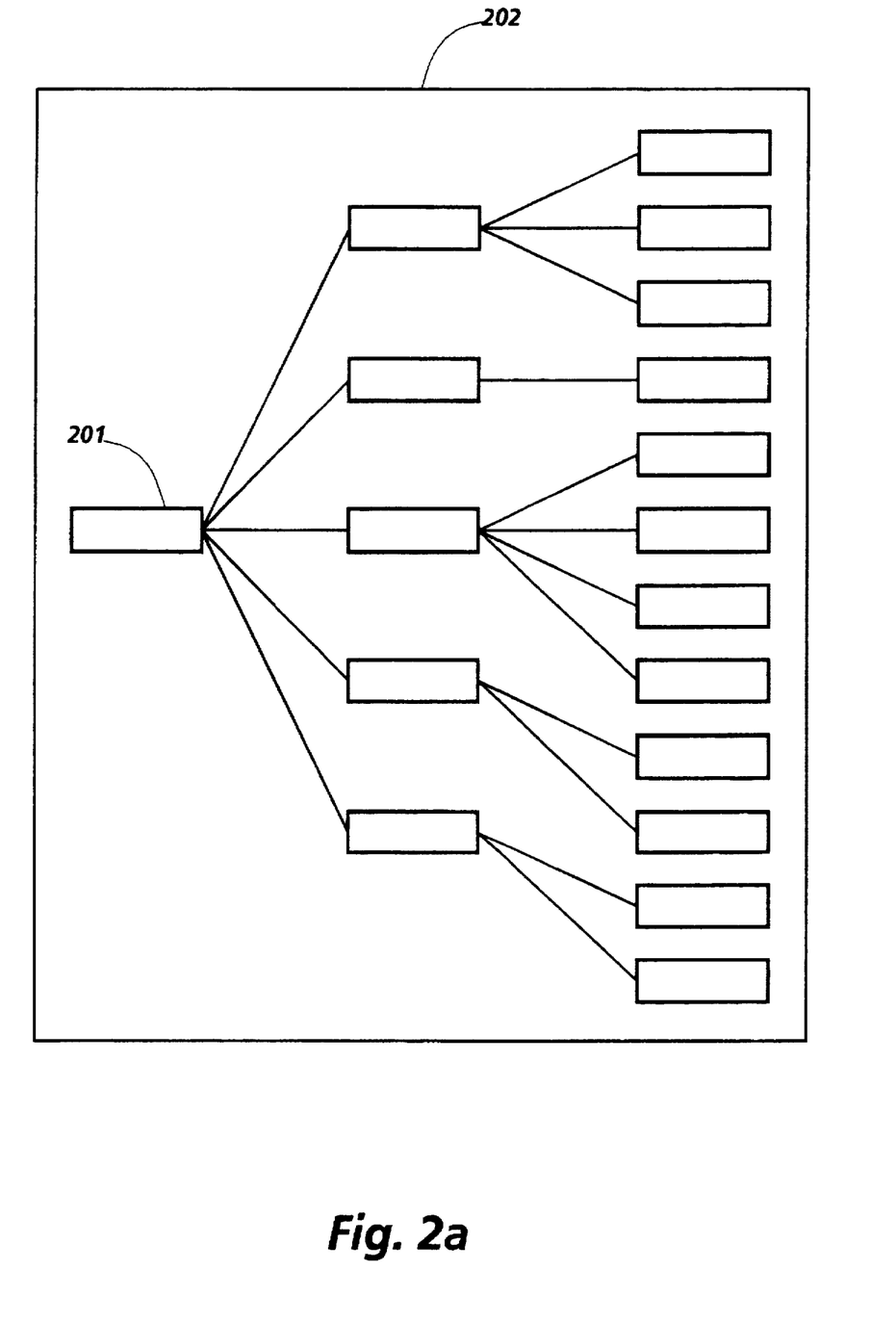
FIG. 2a illustrates a tree structure laid out on a plane.
Figure 2B:
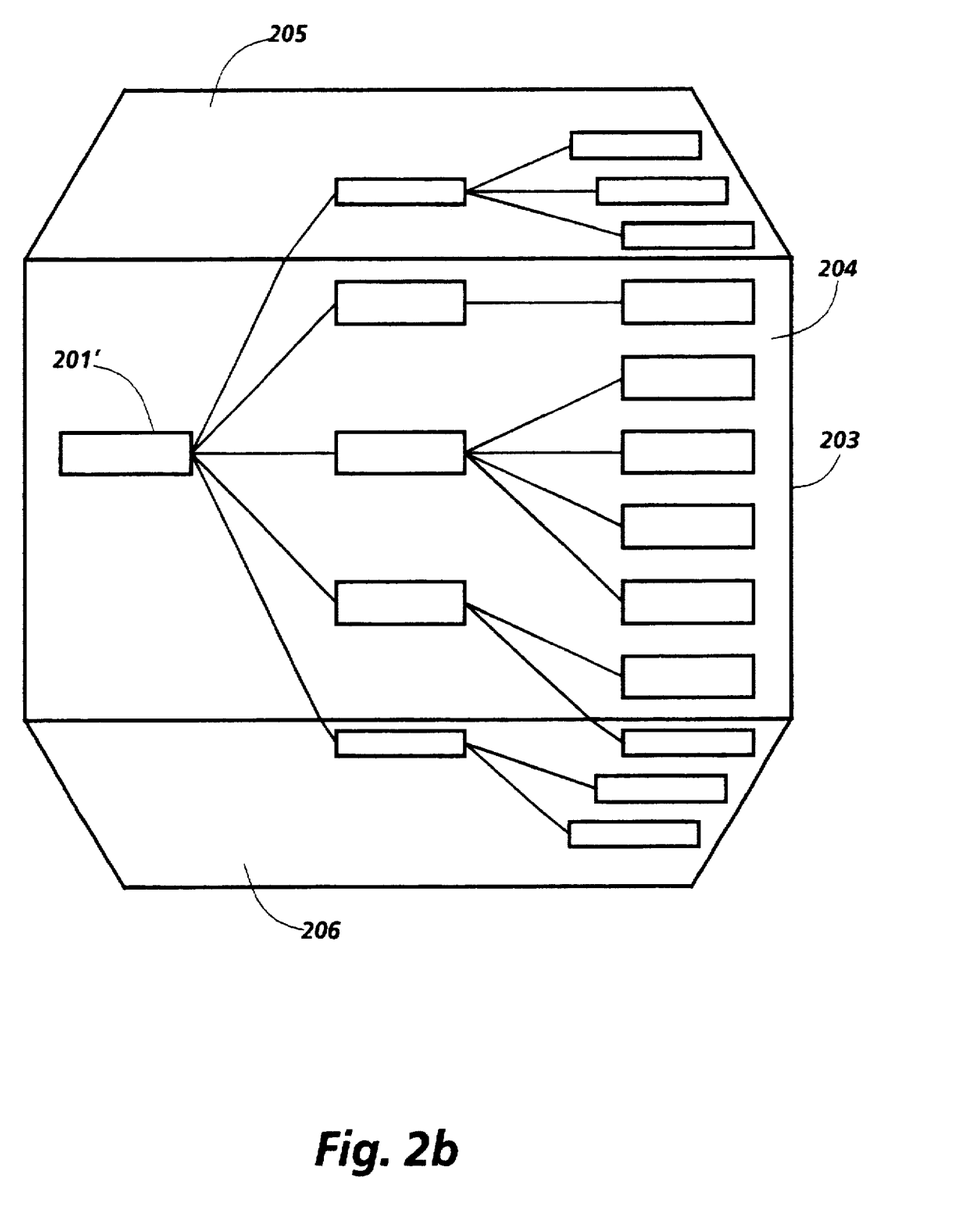
FIG. 2b illustrates the tree structure of FIG. 2a which has been mapped to a reference surface of the currently preferred embodiment of the present invention.

FIGS. 2a and 2b illustrate the visualization of a tree structure in the currently preferred embodiment. FIG. 2a illustrates a tree structure 201 which is projected onto a plane 202. Referring to FIG. 2b, the same tree structure 201' has been mapped onto a reference surface 203. The reference surface 203 has a center panel 204 sharing an edge with a top panel 205 and a bottom panel 206. The center panel 204 has a rectangular shape while the top panel 205 and bottom panel 206 have trapezoidal shapes.

Although not illustrated, the reference surface may be rotated by 180 degrees. This may be done if it is desirable to have a vertical representation of a tree structure. Further, the various levels of the tree structure of FIGS. 2a and 2b are aligned in columns. As will become apparent in the description below, such an alignment reduces processing computations for scrolling of the tree structure across the reference surface and does not effect the underlying nature of the tree structure. However, it would be apparent to one of skill in the art to practice the present invention with a tree structure where the various levels are not vertically aligned in columns.

Figure 3A:
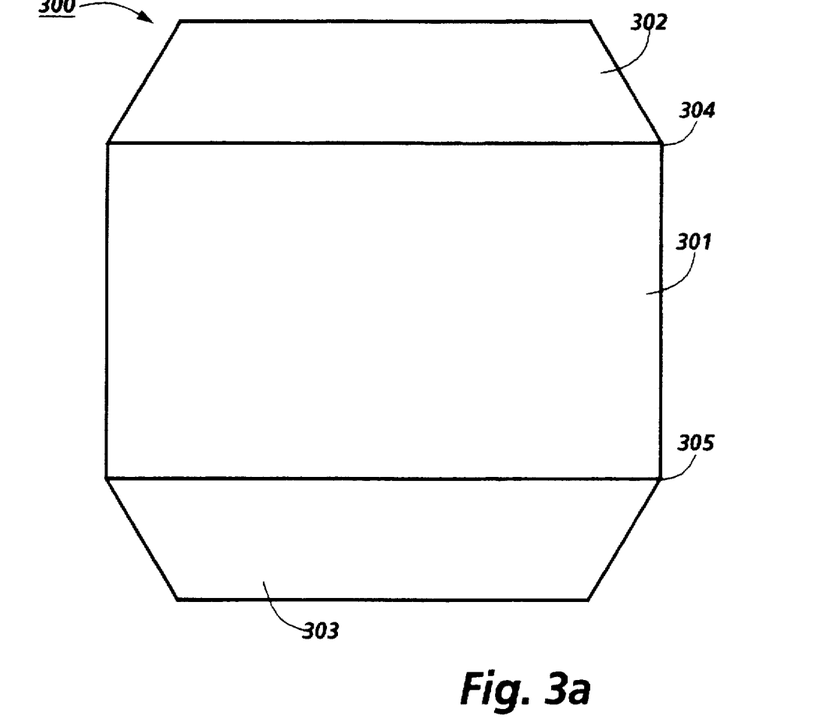
FIG. 3a illustrates a reference surface which is perceived as three-dimensional as is utilized by the currently preferred embodiment of the present invention.
Figure 3B:
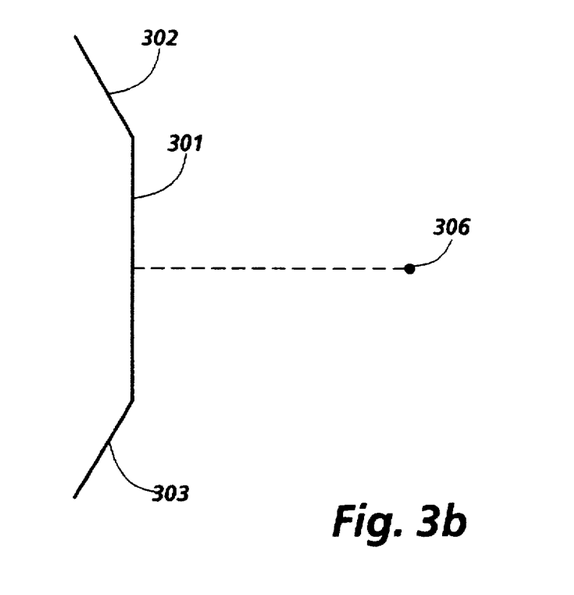
FIG. 3b is a side view of the reference surface of FIG. 3a with respect to a user viewpoint.

The reference surface provides visual cues so that the visualization is perceived as three dimensional. FIGS. 3a and 3b illustrate the reference surface in greater detail. FIG. 3a illustrates a reference surface as displayed. The reference surface 300 is comprised of a center panel 301, a top panel 302 and a bottom panel 303. The top panel 302 is perceived as folded back from center panel 301 at fold edge 304. The bottom panel 303 is perceived as folded back from center panel 301 at fold edge 305. In order to provide visual cues as to three-dimensions (i.e. it is folded back) the top panel 302 and bottom panel 303 have different fill patterns than center panel 301. Further, the background of the reference surface may also be shaded to provide the three-dimensional visual effect.

FIG. 3b is a side view of the reference surface 300 with respect to user viewpoint 306. From FIG. 3b, it is readily observed that the user viewpoint 306 is orthogonal to center panel 301, whereas information on top panel 302 and bottom panel 303 are not. Accordingly, information in top panel 302 or bottom panel 303 are viewed in perspective.

It should further be noted that the size of the display area for the reference surface may change. In the currently preferred embodiment when the width of the display area changes, all the panel widths correspondingly change. However, if there is a change to the height of the display area, only the center panel will change height. This is done to show the maximum number of nodes in detail while retaining context. And as will be described in greater detail below, it negates the need to update look-up tables used in creating the three-dimensional effect of the tree structure.

Figure 4:
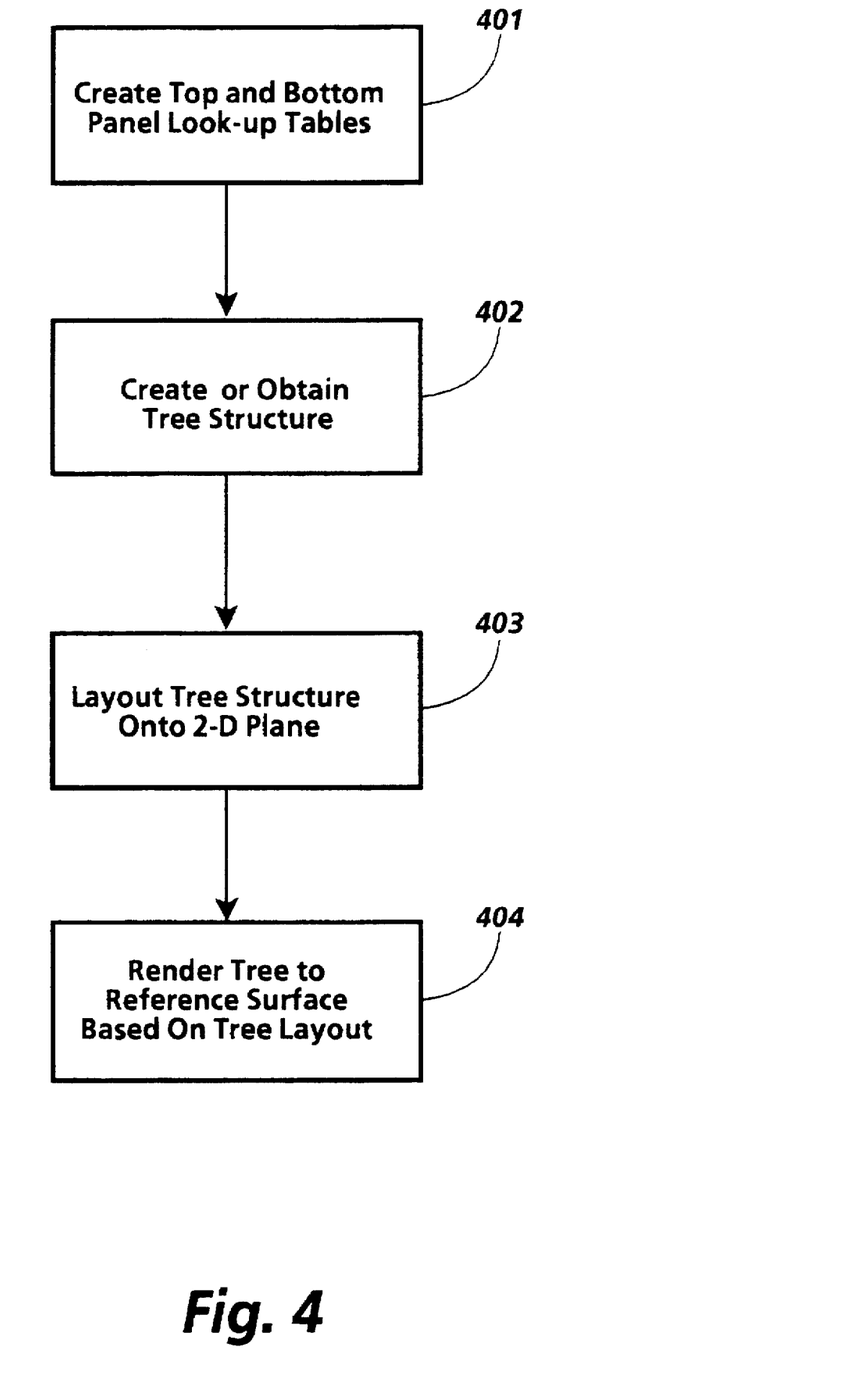
FIG. 4 is a flowchart of the general steps performed when creating the visualization in a tree structure in the currently preferred embodiment of the present invention.

FIG. 4 is a flowchart describing the general steps performed for the rendering of the present invention's visualization of a tree structure. First, perspective transformation look-up tables for the top and bottom panels are created, step 401. These look-up tables are for creating the display data for portions of the tree structure on the top and bottom panels. The look-up tables are static for the durations of the visualization. In the currently preferred embodiment, each look-up table stores 3000 sample points for transforming an orthogonal view to a perspective view. Values between the sample points are obtained through interpolation. Techniques for creating such a look-up table to create a perspective view are well known in the art. Thus, further description on the generation of sample points in the look-up table is not deemed necessary. Next, the tree structure (i.e. the node/link pointer data) is created or otherwise obtained, step 402. Creation of the tree structure is dependent on what the structure represents. In the currently preferred embodiment, a hierarchical view of the results of a database search are embodied in the tree structure. A description of the creation of the tree structure in the currently preferred embodiment is provided below. Once the tree structure is created or obtained, it is mapped to the reference surface by the following steps. First, the tree structure is laid out on a two dimensional plane, step 403. Initial layout of the tree structure will center the tree on the reference surface. Subsequent layouts, e.g. as an effect of scrolling, will cause the layout positions to move. In the laying out step, each node will obtain a planar address. The tree is then rendered onto the reference surface, step 404. This is accomplished by transforming the plane coordinates for the nodes to screen coordinates using the look-up tables generated in step 401 for nodes in the top and bottom panels and direct scaling for nodes in the center panel.

When the visualization is presented to a user, the reference surface is displayed and the tree structure overlaid. The user invocation of and processing for scrolling of the tree structure is described in greater detail below.

The rendering of the visualization is less computationaly intensive because of the assumptions that the user's point of view is constant, i.e. orthogonal to the center panel and that the top and bottom panels are symmetric. However, it retains the benefit of a three-dimensional representation of viewing both context and detail concurrently.

The present invention is now described in reference to its currently preferred embodiment of viewing the results of a database search. However, it would be apparent to one of skilled in the art that the visualization of the present invention could be used for viewing any information capable of representation in a tree structure.

Information Visualization of Database Search Results

In the currently preferred embodiment of the present invention, a database maintains a collection of documents. Each document has multiple indices by which it can be referenced. The present invention allows the results of a database search to be organized and viewed in a manner based on these indices. The indices used for organization and viewing may be different from the indices used for the database search. The indices which a user specifies by which they would like to view the search results are termed preferences.

Figure 5:
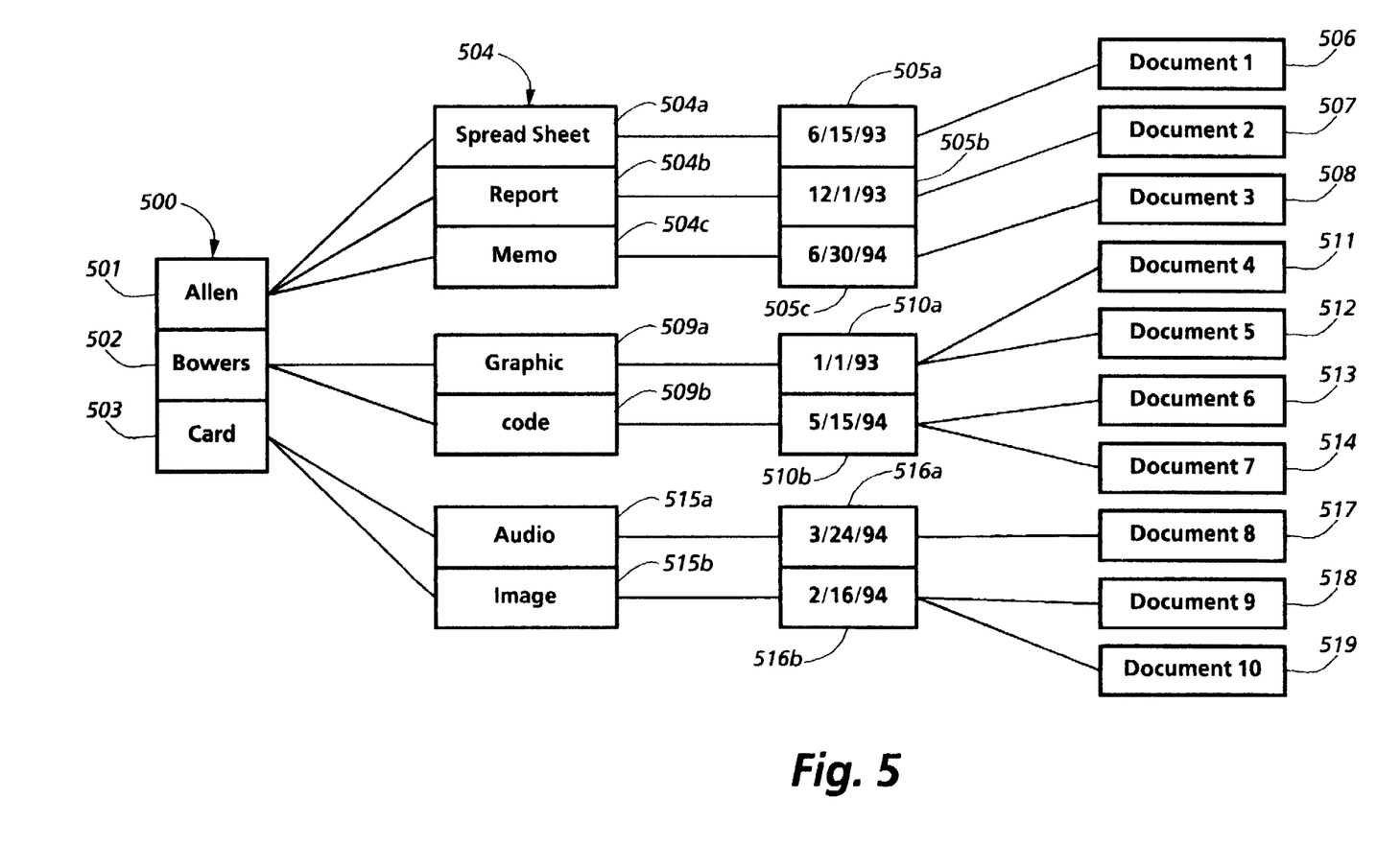
FIG. 5 is an example of a tree structure showing the results of a database search organized based on user specified preferences.

The preferences that a user specifies are ordered. A first preference is used to create the top level of the tree structure, a second preference the second level, and so on until the bottom level of the structure which are representations of the individual items of the search results (i.e. the documents.) Typically, the tree structure created from the search results will be shallow (the number of specified preferences plus 1) and broad (the number of documents in the search result.) A label on each node will indicate the corresponding value for the preference. FIG. 5 illustrates an example of a view of a search result. In this view, a first preference is Authors, a second preference is Type and a third preference is Date. Referring to FIG. 5, a top level 500 identifies three authors, Alien (node 501), Bowers (node 502) and Card (node 503). Following the Allen branch, in the second level of the hierarchy, Type, a grouping 504 of document types is specified, namely Spreadsheet (node 504a), Report (node 504b) and Memo (node 504c). From the third level of the hierarchy, it is observed that the spreadsheet is dated Jun. 15, 1993 (node 505a), the report dated Dec. 1, 1993 (node 505b) and the Memo on Jun. 30, 1994 (node 505c). Finally, we see that from the bottom level of the hierarchy the documents associated with the Allen branch (nodes 506–508).

Following the Bowers branch, it is observed from the second level that documents authored by Bowers are of type Graphics (node 509a) or Code (node 509b). The documents of type Graphics were dated on Jan. 1, 1993 (node 510a) and the code on May 15, 1994 (node 510b). Finally, the documents associated with the Bowers chain are indicated in nodes 511–514.

Following the Card branch, it is observed from the second level that documents authored by Card are of type Audio (node 515a) or Image (node 515b). From the third level, the documents of type Audio are dated Mar. 24, 1994 (node 516a) and the documents of type Image are dated Feb. 16, 1994 (node 5116b). Finally, the documents associated with the Card branch are defined by nodes 517–519.

In the currently preferred embodiment, each database that may be searched will have default preferences that may be used for viewing a tree structure.

It is also worth noting that the preferred embodiment operates within the parameters of a window system. For example, a display view may only show a portion of a tree structure because the window has been sized to be smaller than the actual size of the window display area.

Figure 6:
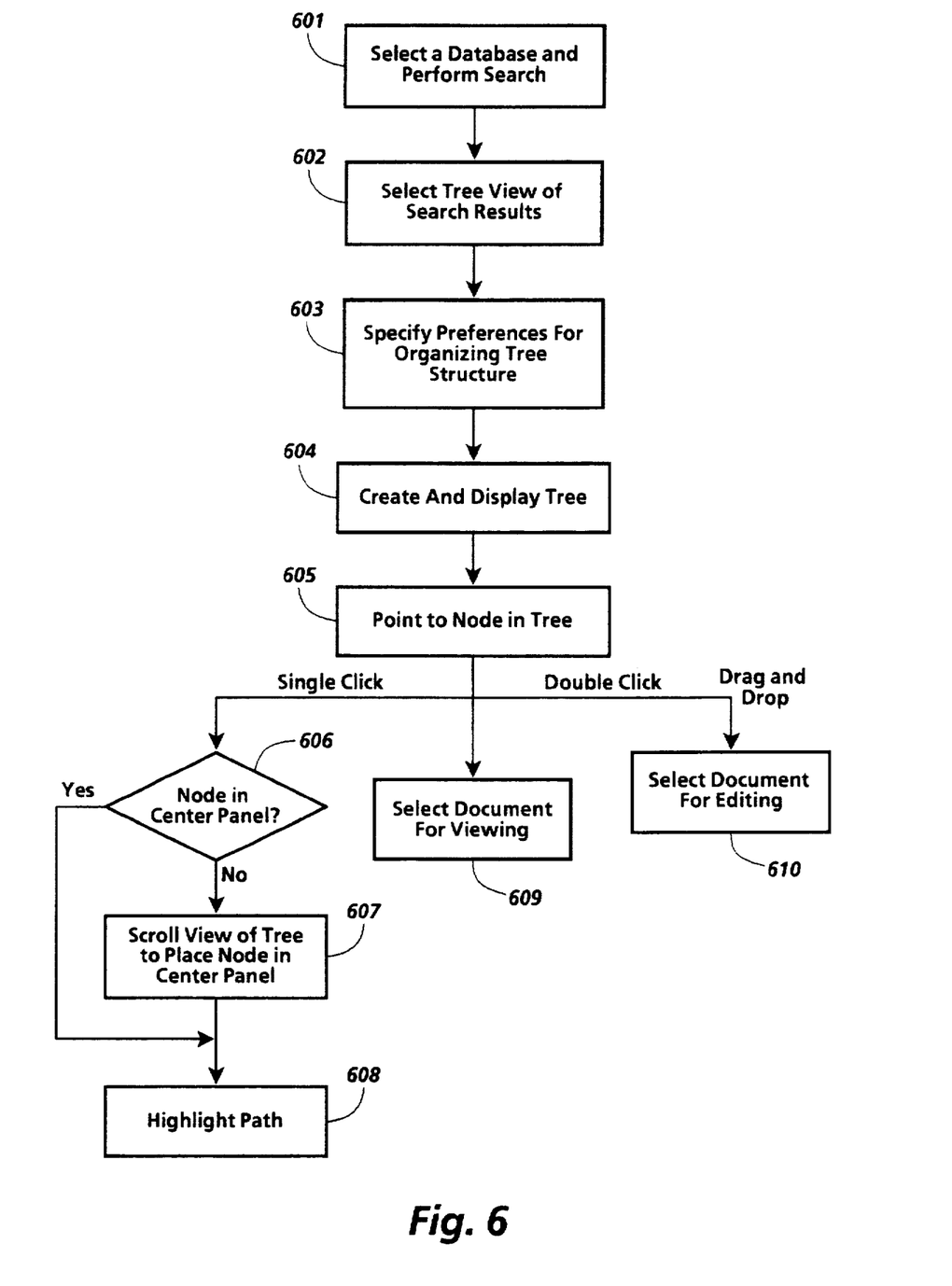
FIG. 6 is a flowchart of user interactions that may be performed in the currently preferred embodiment of the present invention.

The preferred embodiment of the present invention is further described with reference to the flowchart of FIG. 6. Referring to FIG. 6, a user first selects a database and performs a database search, step 601. Once the search is completed, the user may then specify how they would like to view the search results. In the currently preferred embodiment the user may view the results as a list of documents or in a tree structure. The user selects the tree view, step 602. In the currently preferred embodiments, the various view options are represented as icons which the user selects by a point and click operation. Other means of view selection, e.g. via a pull-down menu could be used. Once the user selects the tree view, they must specify the preferences upon which to build the tree structure, step 603. In the currently preferred embodiment, a user may select up to 5 preferences. The primary limitation being the size of a typical display. It would be apparent to one skilled in the art to allow a fewer or greater number of preferences.

The tree structure for the view is then created and displayed based on the search results and the preferences, step 604. The manner in which the tree structure is built is described in greater detail below. At this point, the user may highlight a document path, view a document or cause a document to be retrieved from the database. It should be noted that in the currently preferred embodiment of the present invention, each node is capable of being selected by a point operation using the cursor control device. For any operation, the user first points to a desired node, step 605. Highlighting the document path through the tree structure is invoked by a single click of the cursor control device. The highlighting is accomplished by displaying the path in reverse video (see FIG. 12). Before highlighting it must be determined if the document node corresponding to the pointed to node is in the center panel, step 606. If the document node is in the center panel, the document path is highlighted, step 608. If the document node is not in the center panel, the tree view is rotated (i.e. scrolled) to bring the document node into the center of the center panel, step 607. This scrolling is done automatically. When completed, the document node will be centered in the center panel and the path highlighted per step 608.

Viewing a document, step 609 is invoked by a double click of the cursor control device. The viewing mechanisms of the currently preferred embodiment provide for retrieval of the corresponding document and for presentation on a window in the display. Retreiving a document for editing purposes, step 610 is accomplished through a drag and drop operation (into a predefined work area). Note that in the currently preferred embodiment, the node pointed to need not be the document node. It could be any node in the tree hierarchy which ultimately point to the desired document.

Figure 7:
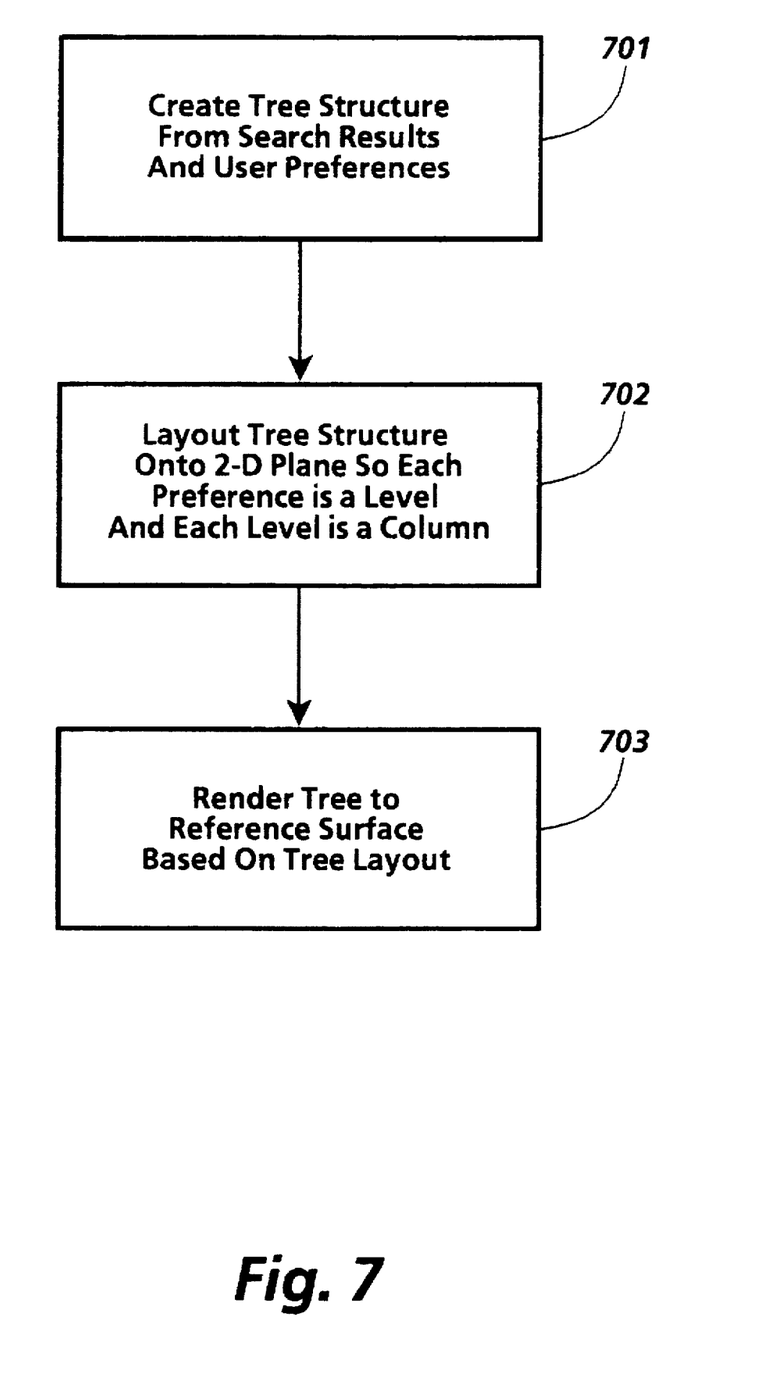
FIG. 7 is a flowchart of the steps performed for generating the visualization of a tree structure in the currently preferred embodiment of the present invention.
Figure 8:
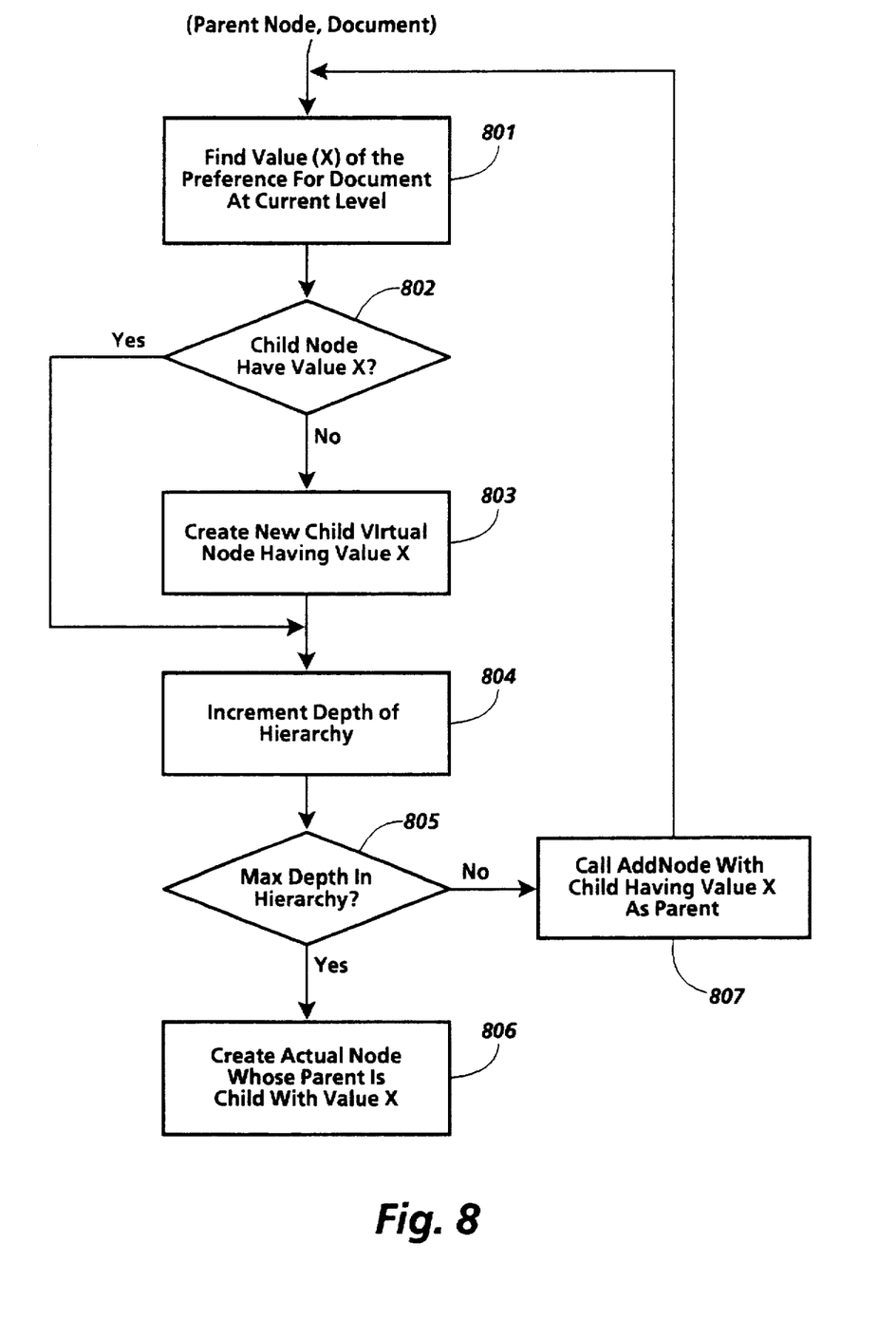
FIG. 8 is a flowchart of the steps for creation of the tree structure in the currently preferred embodiment of the present invention.

The creation and rendering of a tree structure in the currently preferred embodiment is described with reference to the flowchart of FIG. 7. Referring now to FIG. 7, the underlying tree representation is created from the search results and the provided preferences, step 701. In the currently preferred embodiment, the tree consists of virtual nodes, the inner nodes which correspond to the preference values, and actual nodes, the leaf nodes (displayed in the right-most column) which correspond to the documents resulting from the search. In the currently preferred embodiment, the creation of the tree is accomplished through recursive calls to a software program called AddNode. A flowchart outlining the functionality of AddNode is provided in FIG. 8. AddNode takes as input, a parent node and a document. In creating the tree AddNode is called for each document, specifying a root node as the parent node. Referring now to FIG. 8, the value of the preference, say X, for the current depth in the hierarchy is obtained, step 801. This would involve examining the database to determine the value of the index corresponding to the preference. A search is then made to determine if any child node has the value X, step 802. If no child node has the value X, then a new virtual child node having the value X is created, step 803. The depth of the hierarchy is then incremented, step 804. A check is then made to determine if the maximum depth in the hierarchy has been reached, step 805. If it has, then an actual node is created whose parent is the child with the value X (i.e. the current child), step 806. If a child having value X exists, then AddNode is recursively called with that child as the new parent, step 807.

Figure 9:
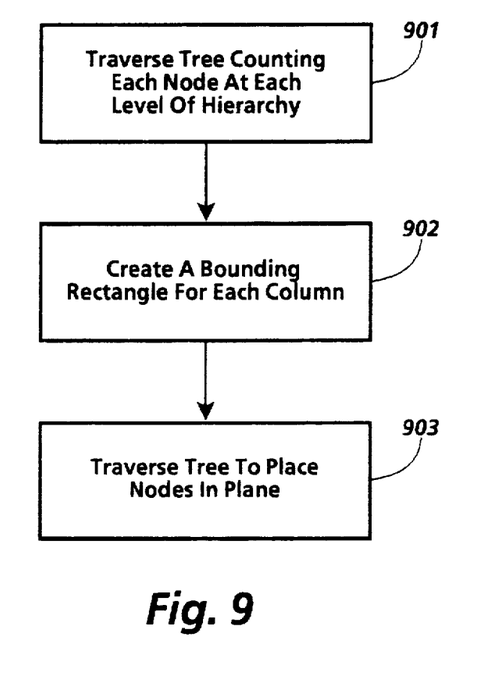
FIG. 9 is a flowchart of the steps for laying out a tree structure onto a plane in the currently preferred embodiment of the present invention.

Referring back to FIG. 7, the tree structure is then laid out on a plane, step 702. It should first be noted that in the currently preferred embodiment each level in the hierarchy is in a column (which is not visible) of the display window. The steps for laying out the tree structure on a plane are illustrated in the flowchart of FIG. 9. Referring to FIG. 9, the tree is traversed to count the number of nodes at each level in the hierarchy, step 901. Each level will form a column so a node count for each column is created. IN the currently preferred embodiment, each nodes when displayed is 80×20 pixels in size. Thus, the size of a column can be readily determined. This will correspond to the number of nodes in a column. Next, a bounding rectangle for each column is determined, step 902. The bounding rectangle is based on the number of columns, the number of nodes in each column, and the dimensions of the display window. The bounding rectangle will encompass all the nodes in a level of the hierarchy. The tree is then traversed to place the nodes in the plane in terms of plane coordinates, step 903. For the placement, the x coordinate is determined by the nodes depth in the hierarchy and the number of levels in the hierarchy. The y coordinate is determined by the node's position within the column as the tree structure is traversed.

Referring back to FIG. 7, the tree layout is then rendered on the reference surface, step 703. This is accomplished by transforming the plane coordinates to display screen coordinates. The transformation that takes place depends on the panel. As described above, the reference surface relates to the plane in that it merely folds at predetermined vertical fold locations (i.e. at a particular Y-coordinate in the plane). So determination of which transformation to use requires examination of the Y-coordinate of the node. For the center panel, plane coordinates are scaled to the those of the reference surface. For the top and bottom panels look-up tables are used to apply perspective transformations on the plane coordinates. For each of the top and bottom panels two look-up tables are used. One look-up table maps plane y-distance from a panel fold to screen y-distance. A second look-up table maps plane x-distance from the center to screen x-distance from the center.

Figure 10:
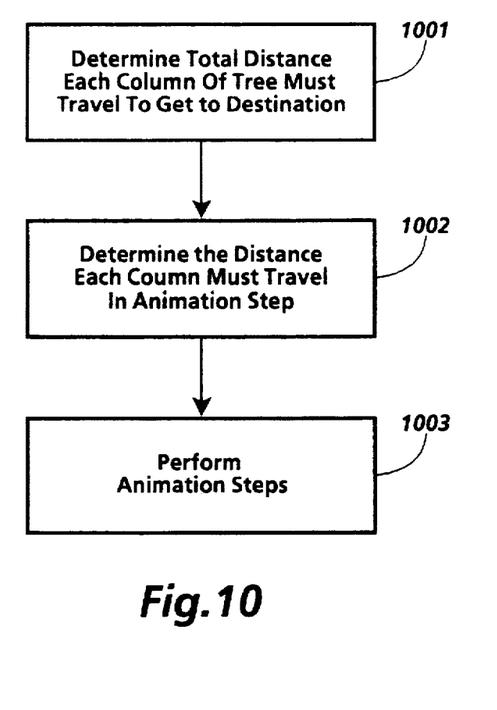
FIG. 10 is a flowchart of the steps for scrolling the tree structure about the reference surface as may be performed in the currently preferred embodiment of the present invention.

As described above with respect to FIG. 6, when a leaf node is in the top or bottom panel and the path to that leaf node is selected, scrolling of the tree may occur. FIG. 10 is a flowchart describing the steps for scrolling. The scrolling of the currently preferred embodiment is intended to provide animation. It has been determined that animation aids the users perception of what is occurring. To accommodate animation, the scrolling occurs in animation steps with a total animation time of 0.6 seconds (which has been determined to be optimal). Referring to FIG. 10, First the distance each column of the tree will need to travel is determined, step 1001. In the currently preferred embodiment the selected nodes, its ancestors and its children will be centered on the reference surface. The distance that must be traveled in each animation step so that the most distant column will get to its destination is then determined, step 1002. This distance is based on the time required for recent tree renderings. This distance will provide an offset for each column for each animation step. The animations steps are then performed, step 1003. Here, tree is rendered on the reference surface incrementing each column's offset towards its destination at each step until all of the columns are at their final destinations.

Internal Representation of a Node

Figure 11:
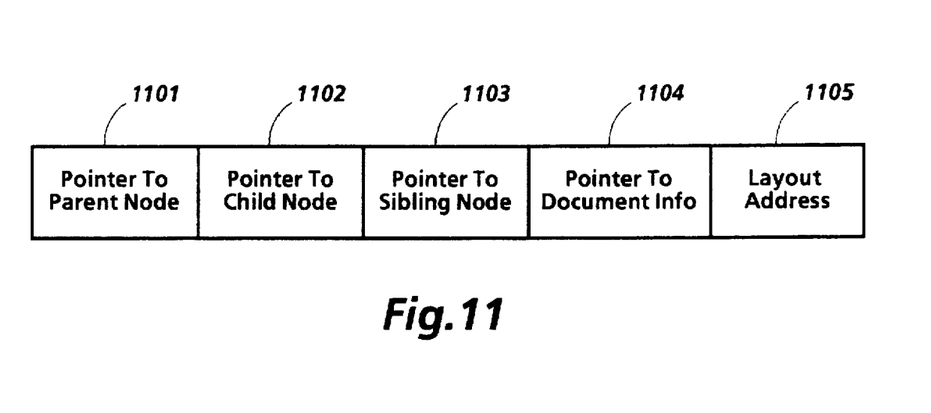
FIG. 11 illustrates a data structure for a node in the currently preferred embodiment of the present invention.

FIG. 11 illustrates a data structure for a node in a tree structure in the currently preferred embodiment of the present invention. The structure is comprised of a plurality of pointers 1101–1104 and a layout address for the node, 1105. The pointer 1101 points to a parent node, the pointer 1102 points to a child node, the pointer 1103 points to a sibling node and the pointer 1104 points to document information. The pointers 1101–1103 are typical for a tree structure representation. The pointer 1104 is used to point to the document itself. The layout address 1105 contains the address for the node with respect to the plane as generated in the layout plane step described in FIG. 9.

Screen Displays of the Currently Preferred Embodiment

Figure 12:
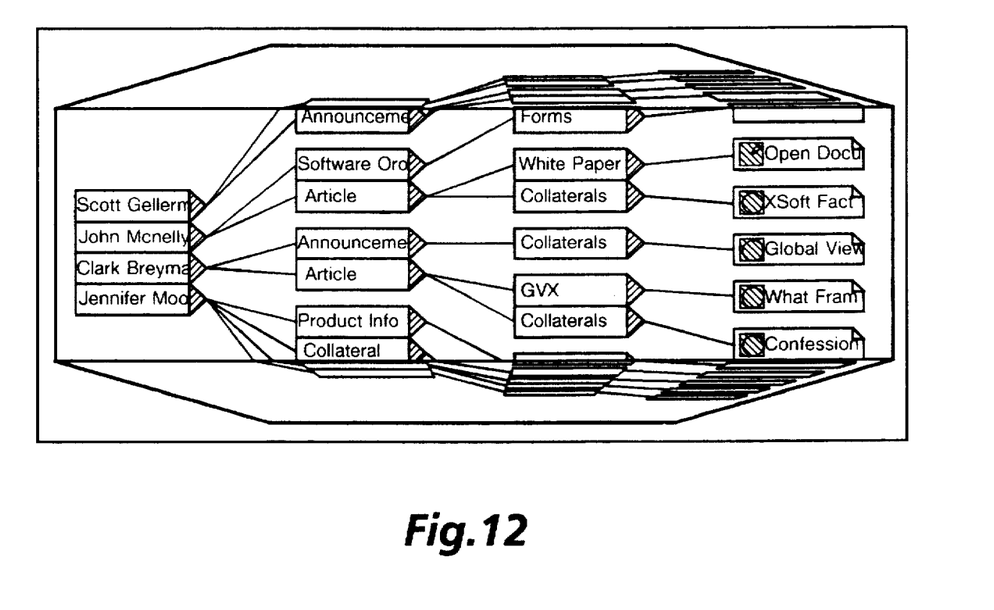
FIG. 12 a screen display of a tree view of the results of a database search in the currently preferred embodiment of the present invention.
Figure 13:
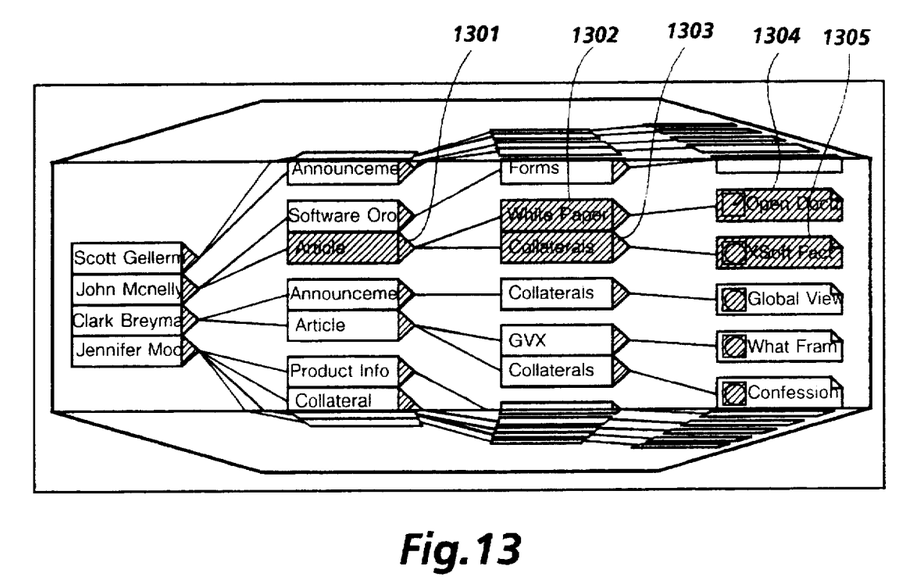
FIG. 13 is a screen display showing a highlighted path, in the currently preferred embodiment of the present invention.
Figure 14:
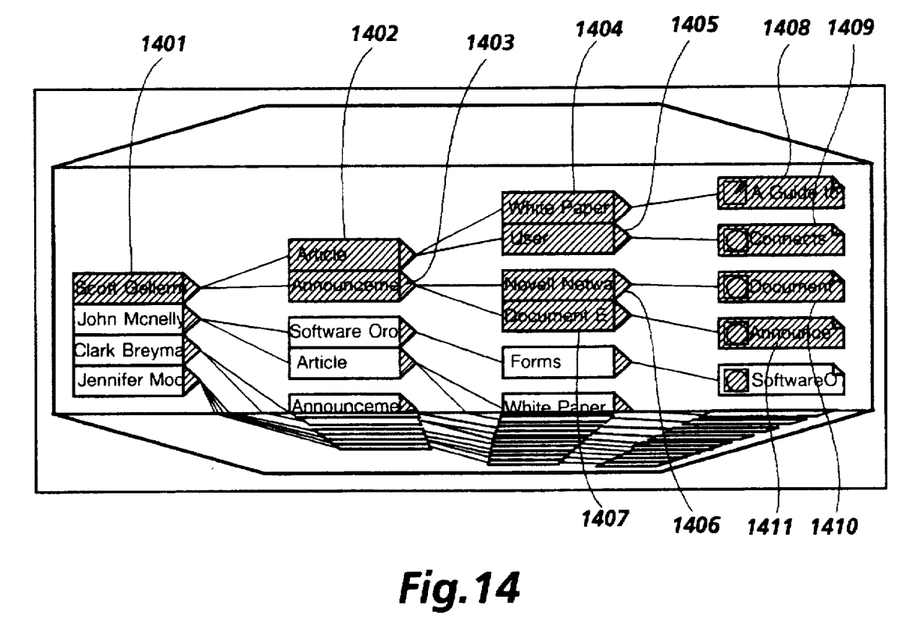
FIG. 14 is a screen display showing a highlighted path after it has been scrolled into view, in the currently preferred embodiment of the present invention.

FIGS. 12–14 "Copyright 1994, Xerox Corporation" (17 U.S.C. 401) are screen displays illustrating the information visualization of database search. Referring to FIG. 12, a tree of a search result is illustrated. Here we see that various nodes have been rendered on the top and bottom panels. FIG. 13 illustrates the highlighting of a node along with its descendant nodes. Referring to FIG. 13, the node 1301 is selected and highlighted. This results in the descendant nodes 1302–1305 to also be highlighted. Finally, FIG. 14 illustrates a selection which causes scrolling. Assuming the starting position as illustrated in FIG. 12, node 1401 is selected. The descendant nodes 1402–1411 are then scrolled to the center panel and highlighted. Note that nodes have scrolled off the center panel and onto the bottom panel.

Thus, a method and apparatus for visualization of a three-dimensional surface is disclosed. While the embodiments disclosed herein are preferred, it will be appreciate from this teaching that various alternative, modifications, variations or improvements therein may be made by those skilled in the art, which are intended to be encompassed by the following claims.

What is claimed:

1. A method for generating hierarchically related information for the results of a query to a database, said database for storing documents, said method comprising the steps of:

a) executing a search on a database to obtain a set of documents;

b) receiving a set of N ordered user specified view preferences, each of said user specified view preferences defining a property of information stored in said database;

c) generating an N+1 level tree structure based on said set of documents and said set of N ordered user specified view preferences;

d) displaying a reference surface on which said tree structure is displayed, said reference surface having a first area for showing a first portion of the tree structure in detail and a second area for showing second portions of said tree structure lacking detail;

e) determining a layout of said tree structure relative to said reference surface;

f) mapping said tree structure to said reference surface based on said layout to create tree display data; and g) displaying said tree structure on said reference surface.

2. The method as recited in claim 1 wherein each node in said N+1 level of said tree structure points to a corresponding document and each of said N levels corresponds to one of said N ordered user specified view preferences.

3. The method as recited in claim 2 wherein said step of generating an N+1 level tree structure is further comprised of:

for each document at each of said 1 to N levels performing the steps of:

c1) retrieving a value for said document at a level being processed;

c2) determining if a child node exists having said value;

c3) if no child nodes exists, creating a new child node having said value and processing next level; and c4) if a child exists having said value, processing next level.

4. The method as recited in claim 1 wherein N is less than or equal to 5.

5. A computer controlled display system for displaying the results of queries to a database comprising:

receiving means for receiving a set of document indicators, said set of document indicators corresponding to the results of a database query;

means for specifying one or more search preferences;

means for constructing a tree structure based on said one or more search preferences and said set of document indicators;

means for generating a reference surface on which said tree structure is displayed, said reference surface having a first area for showing a first portion of the tree structure in detail and a second area for showing second portions of said tree structure lacking detail;

layout generation means for generating a layout of said tree structure relative to said reference surface;

mapping said tree structure to said reference surface based on said layout to create tree display data; and display means for displaying said tree structure on said reference surface.

6. The computer controlled display system as recited in claim 5 further comprising of means for causing said tree structure to be scrolled across said reference surface.

7. The computer controlled display system as recited in claim 5 further comprising means for highlighting a document path in said tree structure.

8. The computer controlled display system as recited in claim 5 further comprising means for enabling viewing a document from said tree structure.

9. The computer controlled display system as recited in claim 5 further comprising means for enabling retrieval of a document for editing from said tree structure.

* * * * *